Nov. 4, 1924.
B. R. SAUSEN ET AL
1,514,346
SPRAY TOWER
Filed Jan. 27, 1922
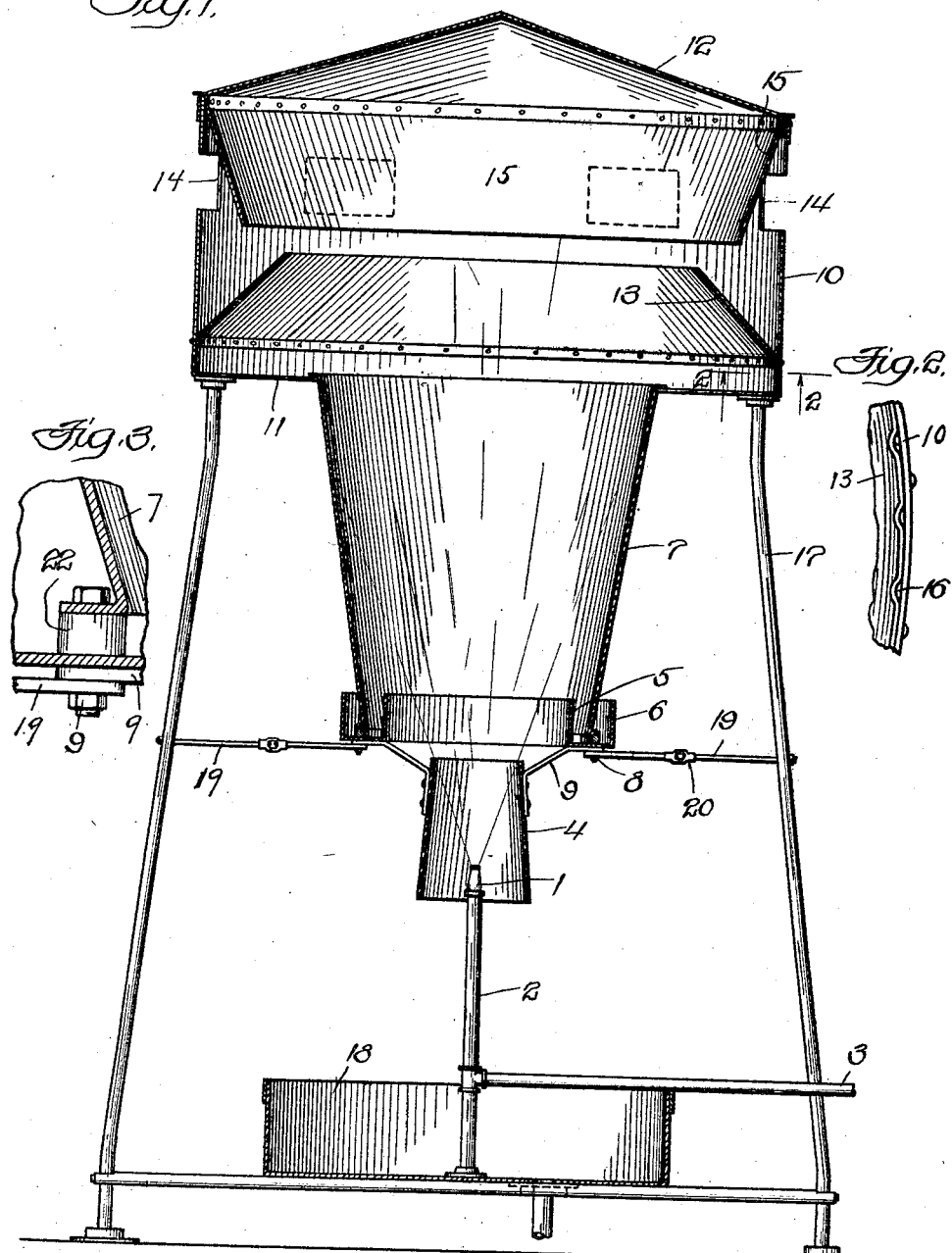
Inventors:
Bert R. Sausen
Harry D. Binko
by Albert Scheib, Atty.

Patented Nov. 4, 1924.

1,514,346

UNITED STATES PATENT OFFICE.

BERT R. SAUSEN, OF CHICAGO, AND HARRY D. BINKS, OF RIVER FOREST, ILLINOIS, ASSIGNORS TO BINKS SPRAY EQUIPMENT CO., OF CHICAGO, ILLINOIS, A CORPORATION OF ILLINOIS.

SPRAY TOWER.

Application filed January 27, 1922. Serial No. 532,292.

*To all whom it may concern:*

Be it known that we, BERT R. SAUSEN, residing at Chicago, Illinois, and HARRY D. BINKS, residing at River Forest, Illinois, both have invented certain new and useful Improvements in Spray Towers; and we do hereby declare the following to be a full, clear, and exact description of the invention, such as will enable others skilled in the art to which it appertains to make and use the same.

Our invention relates to appliances for effecting an interchange of temperature between a liquid and a gas, its general objects being those of providing a convenient and highly effective appliance of this kind which will insure an adequate intermingling of the liquid spray with the air or other gas, and which will effectively prevent particles of liquid from being carried beyond the appliance with the moistened air or the gas.

In our copending application No. 501,742, filed September 19, 1921, on "Spray cooling," we have disclosed a heat interchanging appliance in which the spray of liquid projected into a spray chamber induces a draft of air into that chamber both through a suction tube surrounding the spray nozzle and around that tube. We have also shown a screen as mounted within the spray chamber to catch particles of the liquid which might otherwise be carried out of this chamber with the issuing moistened air. While the appliance as thus presented in our said copending application has proven decidedly practical, we have found that the cylindrical shape of the suction tube is not most advantageous for producing the suction effect; that the spray if allowed to pass close to the inlet of the suction chamber is apt to interfere with the admission of an adequate supply of air between the suction tube and this inlet; that the use of a screen within the suction chamber is apt to retard the passage of air through this chamber so as to reduce the amount of air below that needed for adequately cooling the spray, also, that without such a screen considerable quantities of spray are apt to be carried through the outlet openings of the spray chamber, thereby causing an undesirable waste of liquid.

Our present invention aims to overcome all of these objections and aims to provide an equally simple, cheaply constructed and conveniently operated heat interchanging device of the general class which includes spray cooling towers and one which will be unusually effective both in causing the spray to introduce a relatively large amount of air into the spray chamber and in intercepting any particles of liquid spray in the upper portion of this chamber before they can reach the outlets of the chamber. In its immediate commercial applications, our invention is particularly suitable for use in the form of spray cooling towers for cooling the water used in condenser jackets, engine jackets and the like, and we are therefore illustrating and describing it in such an embodiment, although we do not wish to be limited to this particular application of the same. We are also calling attention in the following specification to further and more detailed objects of our invention, and are illustrating these in the copending drawings, in which—

Fig. 1 is a central and vertical section through a spray cooling tower embodying our invention.

Fig. 2 is an enlarged and fragmentary horizontal section taken upwardly along the correspondingly numbered line in Fig. 1 and showing the method of providing outlets through which the drip caught by the lower guard in the spray turret can pass downwardly beyond that guard.

In the embodiment of the drawings, the liquid which is to be warmed or cooled by means of air currents is sprayed upwardly in a diverging spray by a nozzle 1 mounted on a riser pipe 2 to which the liquid is supplied under pressure through a supply pipe 3. Surrounding this nozzle is a suction tube 4 which converges upwardly, and which desirably is of a frusto-conical shape. The nozzle employed is preferably one which affords a socalled solid cone spray with a quite fine division of liquid, and preferably is disposed at such a height within the suction tube 4 that the outer surface of the conical spray will barely clear the upper edge of this tube 4.

Surrounding the said conical spray at a point somewhat higher than the top of the tube 4 is an annular drip pan having an inner and substantially cylindrical wall portion 5 so disposed as to leave an annular gap of considerable width between the top of this cylindrical wall and the conical spray.

The cylindrical wall 5 is desirably connected by a horizontal annular base with a corresponding wall 6 spaced outwardly of the wall 5, so that the said three parts cooperate in affording an annular drip pan. This drip pan underhangs the lower edge of an upwardly flaring spray chamber 7 which desirably also is of an inverted frustoconical form and which desirably is fastened by bolts 8 both to the drip pan 6 and to brackets 9 supporting the suction tube 4. The spray casing 7 opens at its top into an upper turret which desirably is considerably larger in diameter than the upper end of the casing 7 and which is here shown as having a cylindrical lateral wall 10 equipped with a number of openings 14. The wall 10 is desirably fastened tightly to the bottom 11 of the said upper chamber and imperforate top 12, so that the apertures 14 will provide the only outlets from this turret for the air entering the same through the spray chamber 7.

With the parts thus arranged, it will be obvious from Fig. 1 that the upward spraying of liquid will draw air with it through the suction tube 4, and since the air passage through this tube is greatly restricted by the sloping of the spray towards the upper edge of the tube, the resulting reduction in volume of the entrained air will impart a considerable velocity to the latter. Consequently, as soon as this air passes beyond the top of the suction tube 4 and is free to expand within the spray chamber 7, it will spread into an effective intermingling engagement with the finely divided spray. Moreover, the contracting of the tube 4 upwardly of the latter tends to increase this imparting of velocity to the entrained air by producing substantially a tuyère effect. A somewhat similar effect is also produced in the annular space between the top of the tube 4 and the wall 5 which provides the inlet for the spray chamber 7, so that air is also drawn at considerable velocity through this annular inlet. By thus employing strong and concentric air currents in connection with a finely divided spray, we are able to insure a highly effective intermingling of the air with the spray of liquid, thereby attaining a highly effective interchange of heat between the two.

However, the rapidity of the air currents thus produced would tend to cause strong drafts leading from the upper part of the spray chamber 7 to the outlets 14 and would tend to have the air issuing through these outlets laden with particles of spray which would then condense outside of the appliance so as to cause a corresponding waste of liquid. To avoid this, we interpose at least one guard in the path of the air currents to the apertures 14 for intercepting the air in its path to these outlets and for collecting drops of moisture from this air. For this purpose, we desirably mount within the upper portion or turret a lower guard 13 of substantially a frusto-conical shape contracted upwardly. This guard desirably has its lower portion fastened to the wall 10 of the said turret at some distance from the bottom 11 of the latter, so that the portion of this chamber below the said guard will afford an annular chamber into which finely divided spray can be carried by the swirling air currents issuing from the spray casing 7, so as to afford added opportunity for intermingling air with these finely divided portion of the spray. Then we also desirably provide an upper guard 15 of a conical form contracted downwardly and having its upper portion secured to the wall 10 above the outlets 14 while its lower end is considerably larger in diameter than the upper end of the lower guard 13.

With the two guards thus arranged, it will be obvious from Fig. 1 that each of them is operatively disposed in the path of a portion of the air currents from the spray chamber to the outlets 14 and that when two guards are employed they will cooperate in compelling the said currents in the turret to follow tortuous paths in reaching the outlets. By so doing, we cause this moisture laden air to impinge considerably on both guards, thereby causing any free particles of liquid in the latter to be deposited on the guards. The moisture thus deposited on the upper guard will readily drip off the lower edge of the latter upon the outer face of the lower guard 13 and can then run down this face and drip through apertures provided for this purpose between the lower edge portion of the guard 13 and the wall 10. To allow for such a dripping of the moisture collected on the top of the lower guard, we desirably indent the periphery of the lower edge of the said guard so as to afford recesses 16 adjacent to the wall 10 as shown in Fig. 2, these recesses being preferably of such a small size that they will not permit appreciable upward air currents through the same, although they will allow collected moisture to flow down freely through them.

As a convenient means for supporting the structure above described, we desirably employ risers 17 in the shape of pipes forming posts for supporting the bottom 11 of the upper casing, and we desirably support the spray casing 7 from this upper casing. Then, since the drip chamber 6 and the suction tubes 4 are supported by the spray casing 7, the posts 17 support the entire spray cooling arrangement with the exception of the spray nozzle, the lower drip pan 18 and the piping connected with the spray nozzle. We also desirably provide braces 19 connecting the posts 17 with the above described cooling tower parts, the connection being desirably made through the bolts 8 so as to lead simultaneously to the lower end of the spray casing 7, the bottom of the drip pan 6 and the brackets 9 which support the suction tube. By employing turnbuckles 20 as portions of these braces 19, we can readily adjust these braces so as to avoid any swaying of the numerous portions of our appliance which are disposed below, but supported by, the upper casing.

Thus constructed, our spray tower forms an easily erected spray cooling appliance in which the spray of liquid is continuously shielded from outside air currents, thus avoiding the scattering and loss of liquid encountered in windy weather with open sprays. By constructing the suction tube and the spray casing in oppositely flaring forms we obtain substantially a tuyère effect for greatly increasing the velocity of the air and for entraining the latter to an adequate extent. At the same time, the greately enlarged diameter of the upper or turret portion of our spray tower in comparison with that of the spray chamber permits the moistened air to expand and to reduce in velocity to a large extent before reaching the outlets, thereby facilitating the effective removal by the guards of the drops of spray which would otherwise be carried out through these outlets. By combining the several features above described we are therefore able to effect a large amount of liquid cooling in a given time within a relatively small and exceedingly simple appliance.

However, while we have illustrated and described our invention in an embodiment designed for a particular and highly commercial purpose and have disclosed the details of construction and arrangement of a highly desirable form of such an appliance, we do not wish to be limited to what we have thus disclosed, it being obvious that numerous modifications might be made in the same without departing either from the spirit of our invention or from the appended claims.

We claim as our invention:

1. A spray cooling tower comprising a substantially vertical casing having an enlarged upper portion equipped with an opening, means for spraying liquid upwardly into the casing and entraining air upwardly into the same by the spraying, and deflecting means within the enlarged upper portion for directing spray downwardly of the casing while permitting the moistened air to pass out through the opening, the deflecting means including a downwardly flaring annular shield and a second annular shield spaced from and disposed above the aforesaid shield and larger at its lower end than the upper end of the aforesaid shield.

2. A spray cooling tower comprising a substantially vertical casing having an enlarged upper portion equipped with an opening, means for spraying liquid upwardly into the casing and entraining air upwardly into the same by the spraying, and deflecting means within the enlarged upper portion for directing spray downwardly of the casing while permitting the moistened air to pass out through the opening, the deflecting means including a downwardly flaring annular shield and a second annular shield flaring upwardly and having its lower end larger in diameter than the upper end of the aforesaid shield.

3. A spray cooling tower comprising a substantially vertical casing having an enlarged upper portion equipped with an opening, means for spraying liquid upwardly into the casing and entraining air upwardly into the same by the spraying, and deflecting means within the enlarged upper portion for directing spray downwardly of the casing while permitting the moistened air to pass out through the opening, the deflecting means including a downwardly flaring annular shield and a second annular shield flaring upwardly and having its lower end larger in diameter than the upper end of the aforesaid shield and disposed above the said upper end.

4. A spray cooling tower comprising a substantially vertical casing having an enlarged upper portion equipped with an opening, means for spraying liquid upwardly into the casing and entraining air upwardly into the same by the spraying, and deflecting means within the enlarged upper portion for directing spray downwardly of the casing while permitting the moistened air to pass out through the opening, the deflecting means including a downwardly flaring annular shield reaching outwardly to the sides of the upper chamber and connected to the latter above the bottom thereof, and means associated with the said connection for permitting drip collected by the top of the annular shield to pass downwardly beyond the latter.

5. A spray cooling tower comprising a substantially vertical casing having an enlarged upper portion equipped with an opening, means for spraying liquid upwardly into the casing and entraining air upwardly into the same by the spraying, and deflecting means within the enlarged upper portion for directing spray downwardly of the casing while permitting the moistened air to pass out through the opening, the deflecting means including a downwardly flaring annular shield reaching outwardly to the sides of the upper chamber and connected to the latter above the bottom thereof, there being openings between the bottom of the annular shield and the said sides for permitting drip collected by the top of the shield to pass downwardly beyond the latter.

6. A spray tower comprising an upper chamber closed at its top and provided with lateral outlets, an upwardly flaring tubular spray casing opening at its top into the said chamber, an upwardly contracted draft-producing tube mounted below the lower end of the spray casing and having its upper end smaller than the bottom of the said casing and laterally spaced therefrom, and means for projecting liquid spray into the said casing from a point within the said tube.

7. A spray tower as per claim 6, in which the spraying means are arranged for projecting a spray diverging substantially into engagement with the upper end of the said tube but out of contact with the inlet of the said casing.

8. A spray tower comprising an upper chamber closed at its top and provided with lateral outlets, an upwardly flaring tubular spray casing opening at its top into the said chamber, an upwardly contracted draft-producing tube mounted below the lower end of the spray casing and having its upper end smaller than the bottom of the said casing and laterally spaced therefrom, means for projecting liquid spray into the said casing from a point within the said tube, and an annular drip pan underhanging the bottom of the said casing and effectively contracting the inlet opening at the lower end of the said casing.

9. A spray tower comprising an upper chamber closed at its top and provided with lateral outlets, an upwardly flaring tubular spray casing opening at its top into the said chamber, an upwardly contracted draft-producing tube mounted below the lower end of the spray casing and having its upper end smaller than the bottom of the said casing and laterally spaced therefrom, means for projecting liquid spray into the said casing from a point within the said tube, and guard means within the upper chamber interposed in the path of the spray towards the said outlets.

10. A spray tower as per claim 6, including common means for supporting the said casing, chamber and tube; and a separate support for the spray producing means.

11. A spray tower as per claim 6, in which the casing is supported by the chamber and the tube is supported by the casing; and risers supporting the chamber.

12. A spray tower as per claim 6, in which the casing is supported by the chamber and the tube is supported by the casing; and risers supporting the chamber; in combination with a drip collecting pan disposed below the tube and also supported by the risers.

13. A spray tower as per claim 6, in which the casing is supported by the chamber and the tube is supported by the casing; risers supporting the chamber; and means independent of the risers for supporting the spray producing means.

14. In a spray cooling tower, a housing having lateral outlets and a central bottom inlet, means for intermingling a liquid spray with air and projecting the resulting mist into the housing through the said inlet, and a pair of relatively spaced annular shields disposed within the housing and arranged for causing the mist to pursue a tortuous path in reaching the outlets and for catching liquid particles of the mist.

15. A spray cooling tower contracted at its bottom, means for spraying liquid upwardly into the tower and for entraining air with the spray, the tower having lateral air outlets near its top, and a pair of vertically spaced and upwardly tapering air deflectors mounted within the casing and arranged for causing the air to follow a tortuous path before reaching the outlets.

Signed at Chicago, Illinois, January 19th, 1922.

BERT R. SAUSEN.
HARRY D. BINKS.